United States Patent
Northey

(10) Patent No.: US 8,641,432 B2
(45) Date of Patent: Feb. 4, 2014

(54) ELECTRICAL POWER CONNECTOR SYSTEM INCLUDING POWER RAIL

(75) Inventor: William A. Northey, Etters, PA (US)

(73) Assignee: FCI Americas Technology LLC, Carson City, NV (US)

( * ) Notice: Subject to any disclaimer, the term of this patent is extended or adjusted under 35 U.S.C. 154(b) by 54 days.

(21) Appl. No.: 13/273,318

(22) Filed: Oct. 14, 2011

(65) Prior Publication Data
US 2012/0094512 A1    Apr. 19, 2012

Related U.S. Application Data

(60) Provisional application No. 61/393,563, filed on Oct. 15, 2010.

(51) Int. Cl.
*H01R 25/00* (2006.01)

(52) U.S. Cl.
USPC ........................................ 439/116; 439/110

(58) Field of Classification Search
USPC ........... 439/79, 825, 826, 827, 692, 947, 149, 439/701, 532, 114, 110, 211, 207, 378, 116
See application file for complete search history.

(56) References Cited

U.S. PATENT DOCUMENTS

| | | | |
|---|---|---|---|
| 2,353,248 A | 7/1944 | Lamb | |
| 4,108,523 A * | 8/1978 | Bolis | 439/116 |
| 4,137,424 A * | 1/1979 | Hesse et al. | 174/97 |
| 4,676,567 A * | 6/1987 | Mouchi | 439/207 |
| 6,848,953 B2 | 2/2005 | Schell et al. | |
| 7,011,534 B2 * | 3/2006 | Shen | 439/119 |
| 7,070,464 B2 | 7/2006 | Clark et al. | |
| 7,503,522 B2 * | 3/2009 | Henley et al. | 244/118.5 |
| 7,520,763 B1 * | 4/2009 | Buse | 439/121 |
| 7,572,976 B1 | 8/2009 | Merrill | |
| 2004/0147177 A1 | 7/2004 | Wagner | |
| 2006/0166536 A1 | 7/2006 | Northey et al. | |
| 2009/0201632 A1 | 8/2009 | Bauer et al. | |
| 2010/0041277 A1 | 2/2010 | Huber et al. | |

FOREIGN PATENT DOCUMENTS

WO    WO 2012/051468    4/2012

OTHER PUBLICATIONS

Methode Electronics, Inc., "PowerRail 2000A", Methode Power Solutions Group, www.methode.com, accessed Jul. 10, 2012, 4 pages.

* cited by examiner

*Primary Examiner* — Neil Abrams
*Assistant Examiner* — Phuongchi T Nguyen
(74) *Attorney, Agent, or Firm* — Woodcock Washburn LLP

(57) ABSTRACT

An electrical connector system includes a plurality of electrical connectors that can be mounted onto a powered rail. Each of the electrical connectors includes a connector housing that retains an electrical contact. The powered rail includes a tapered alignment guide that receives a complementary tapered arm of the connector housing that locates into the alignment guide so as to position the connectors to the rail.

33 Claims, 10 Drawing Sheets

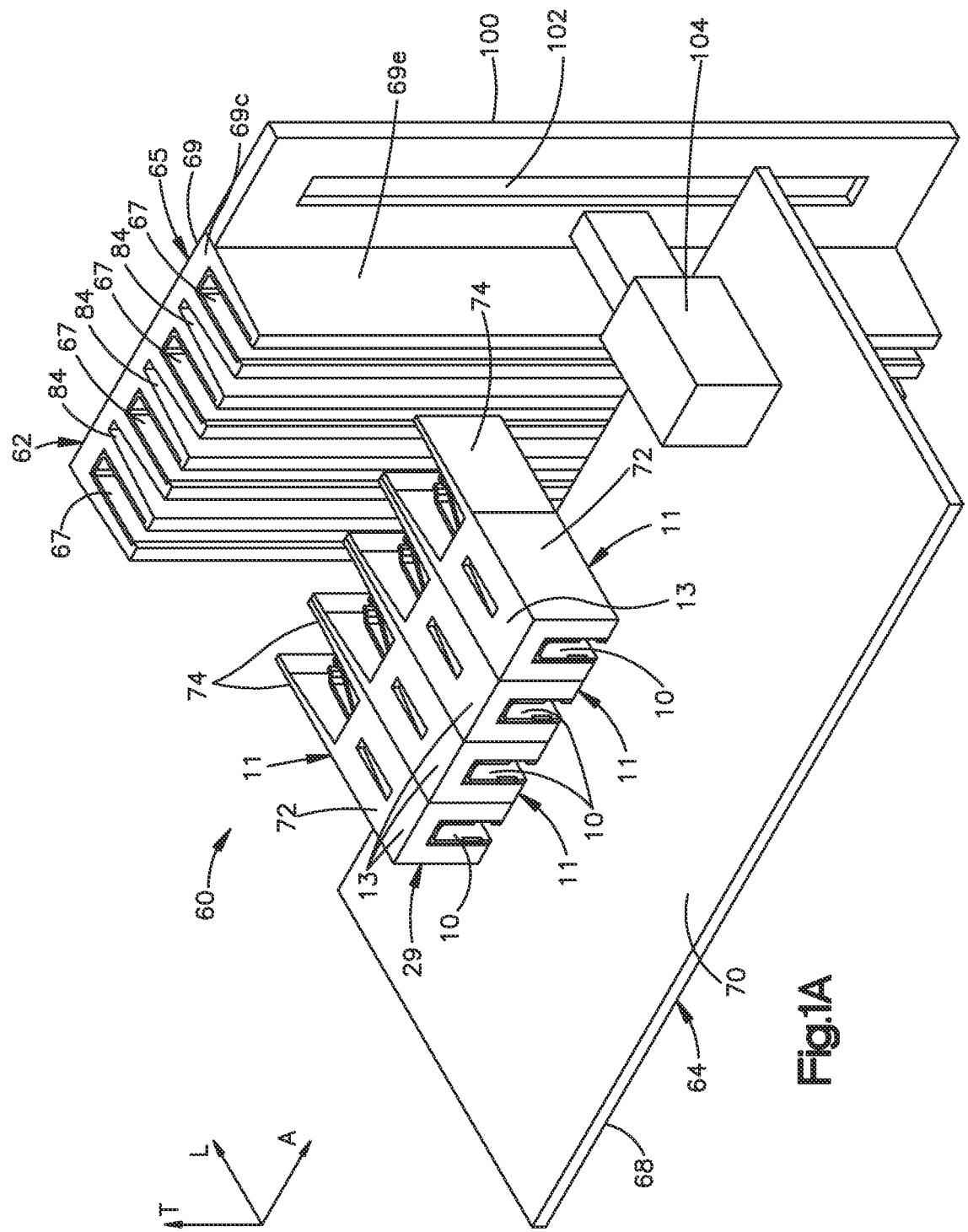

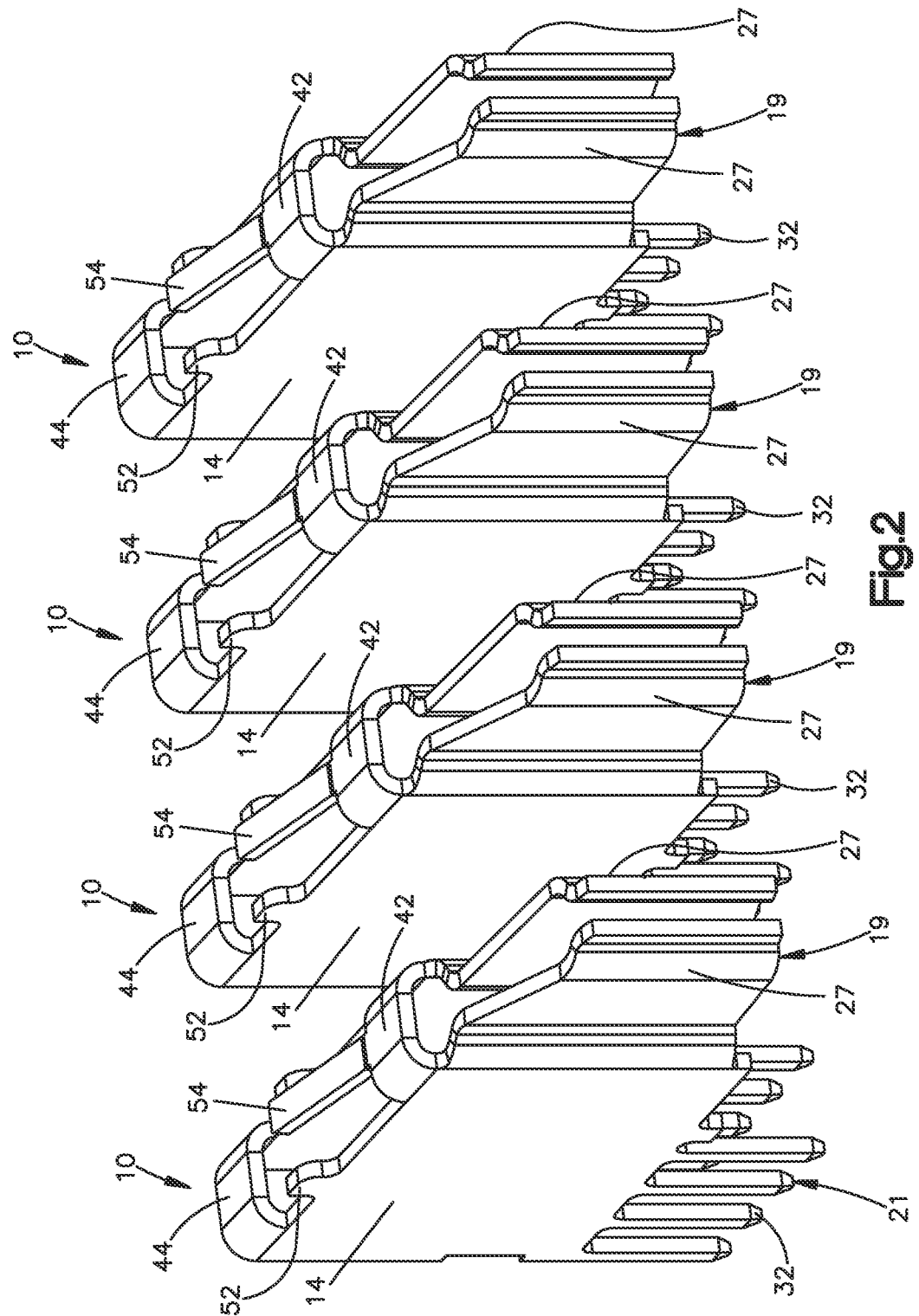

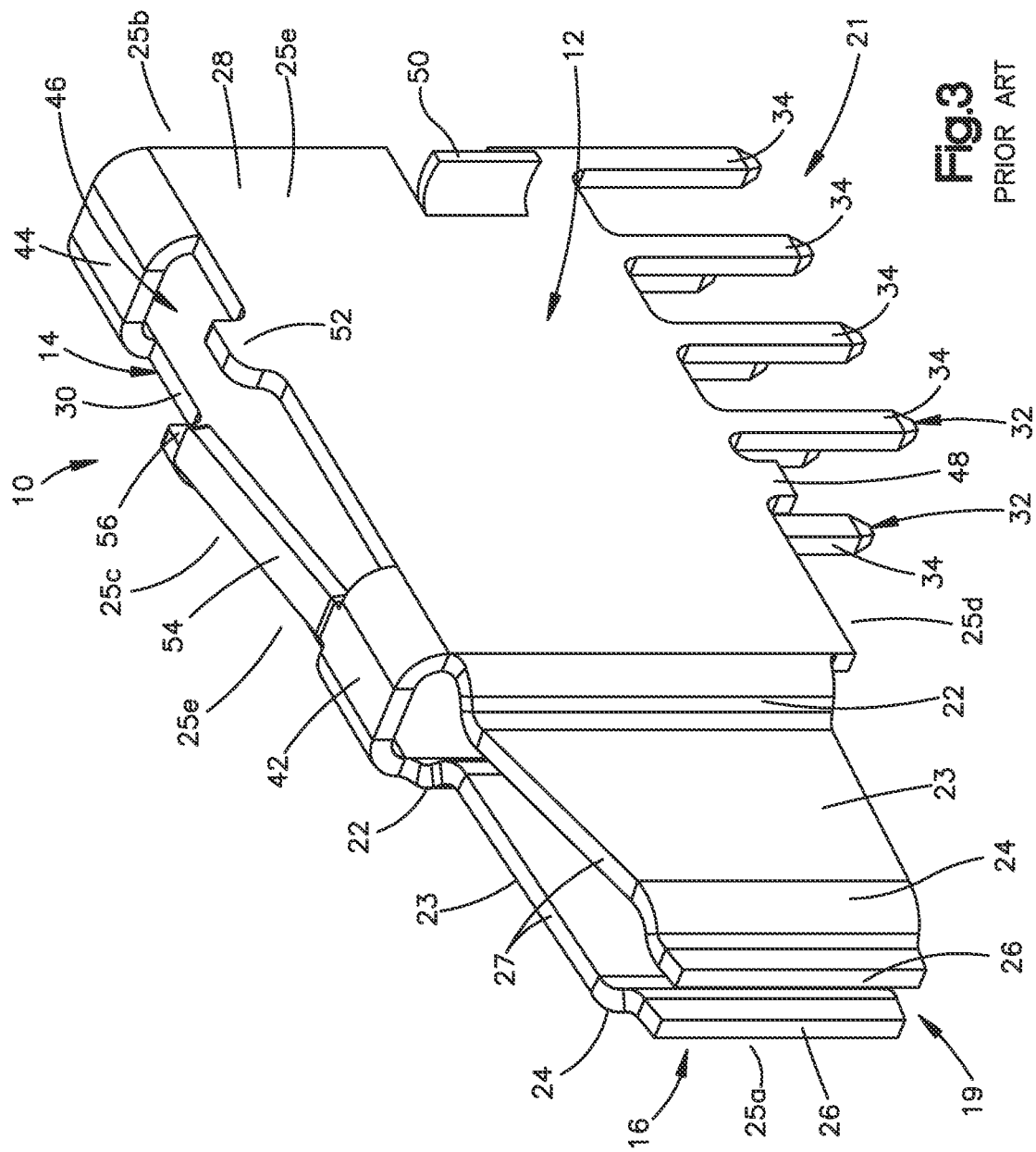

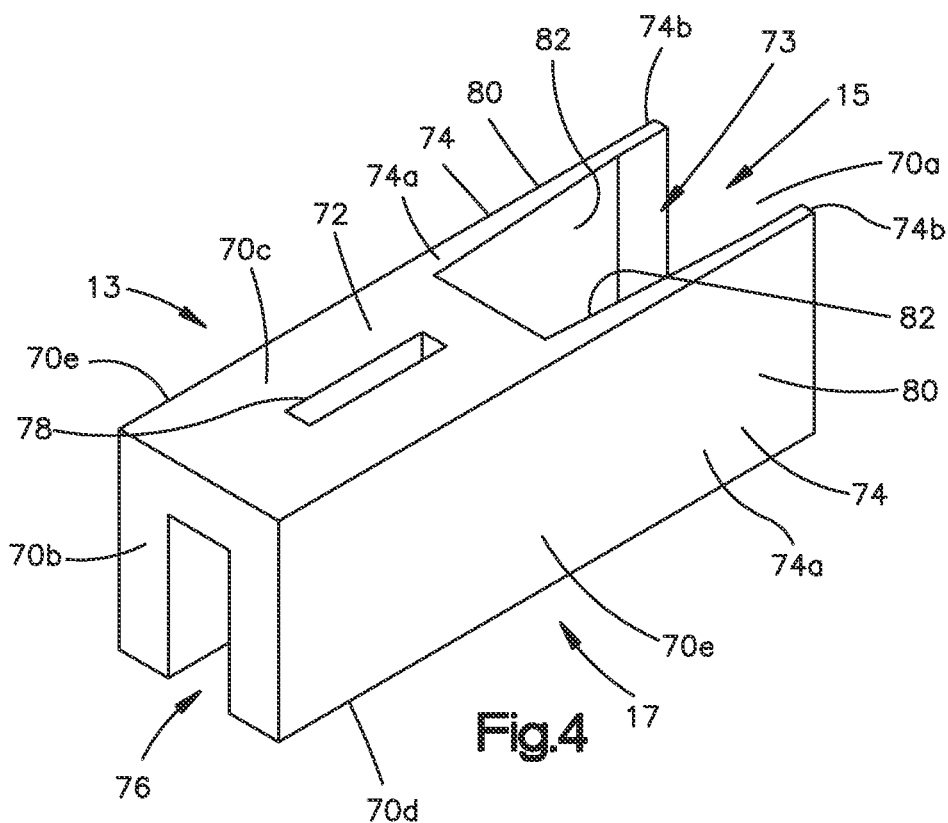
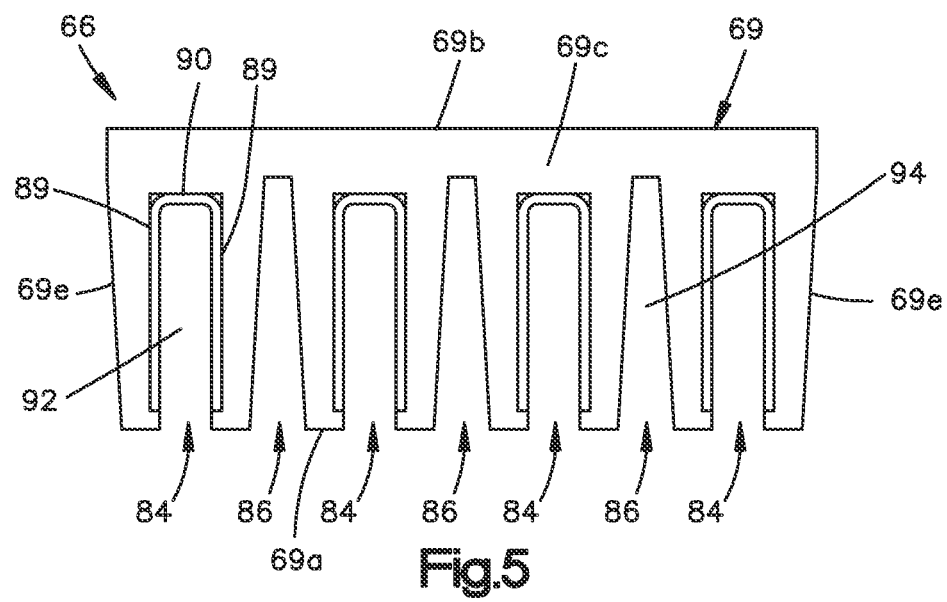

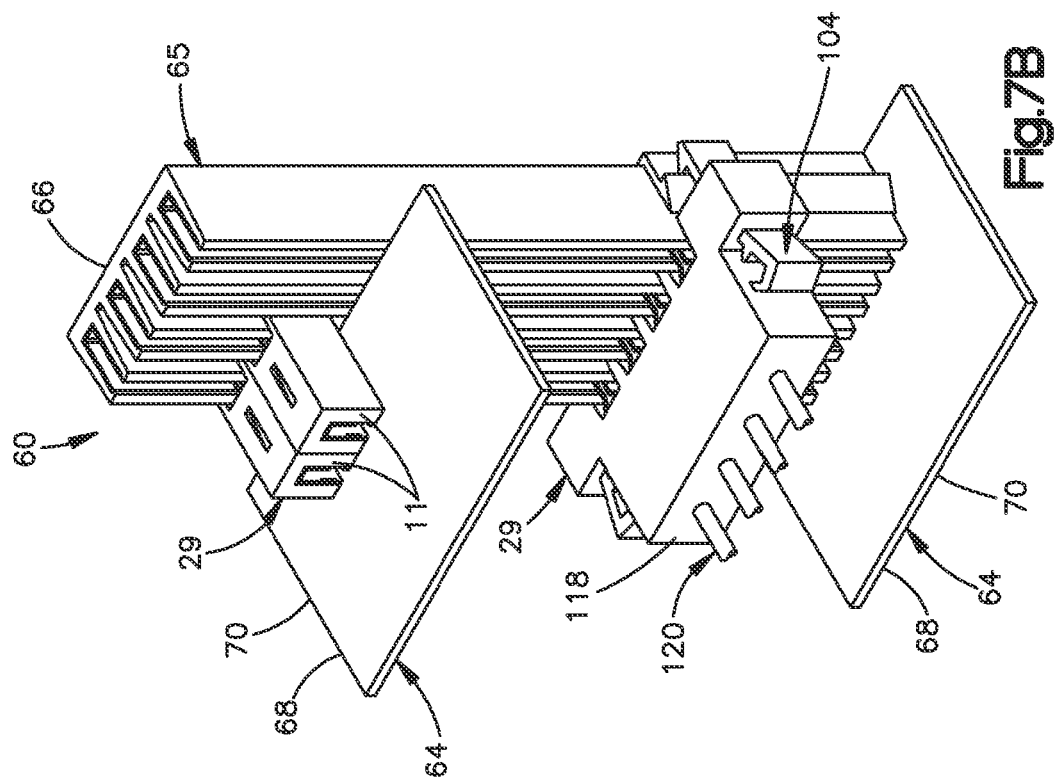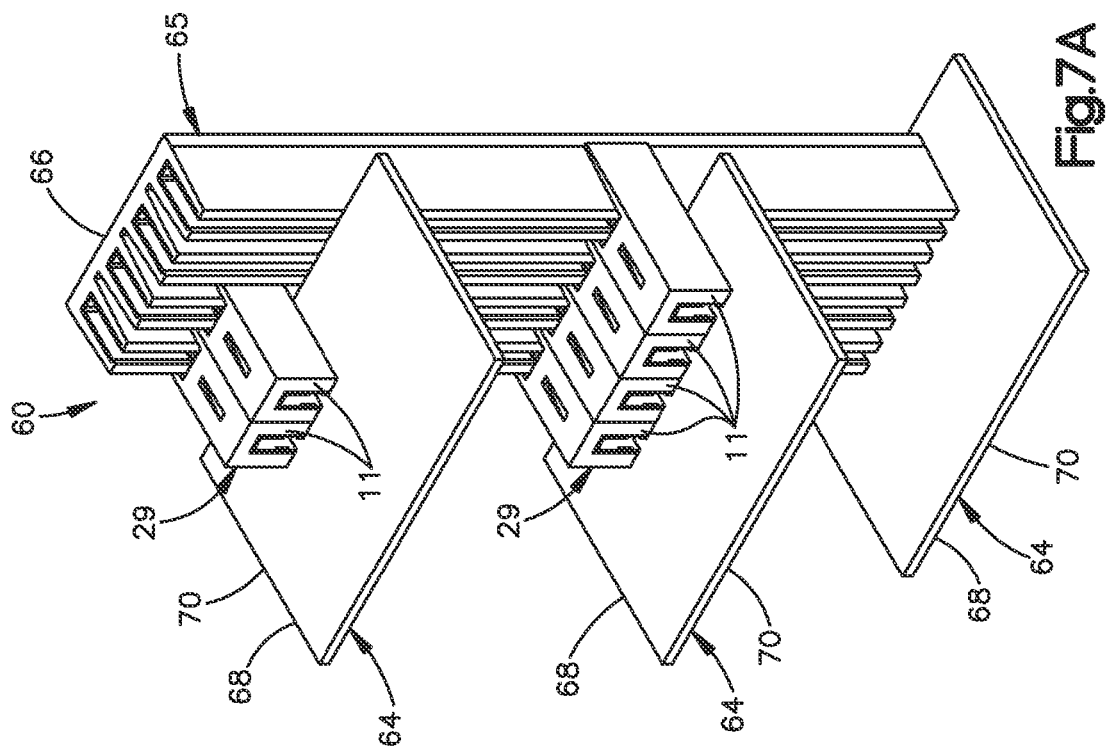

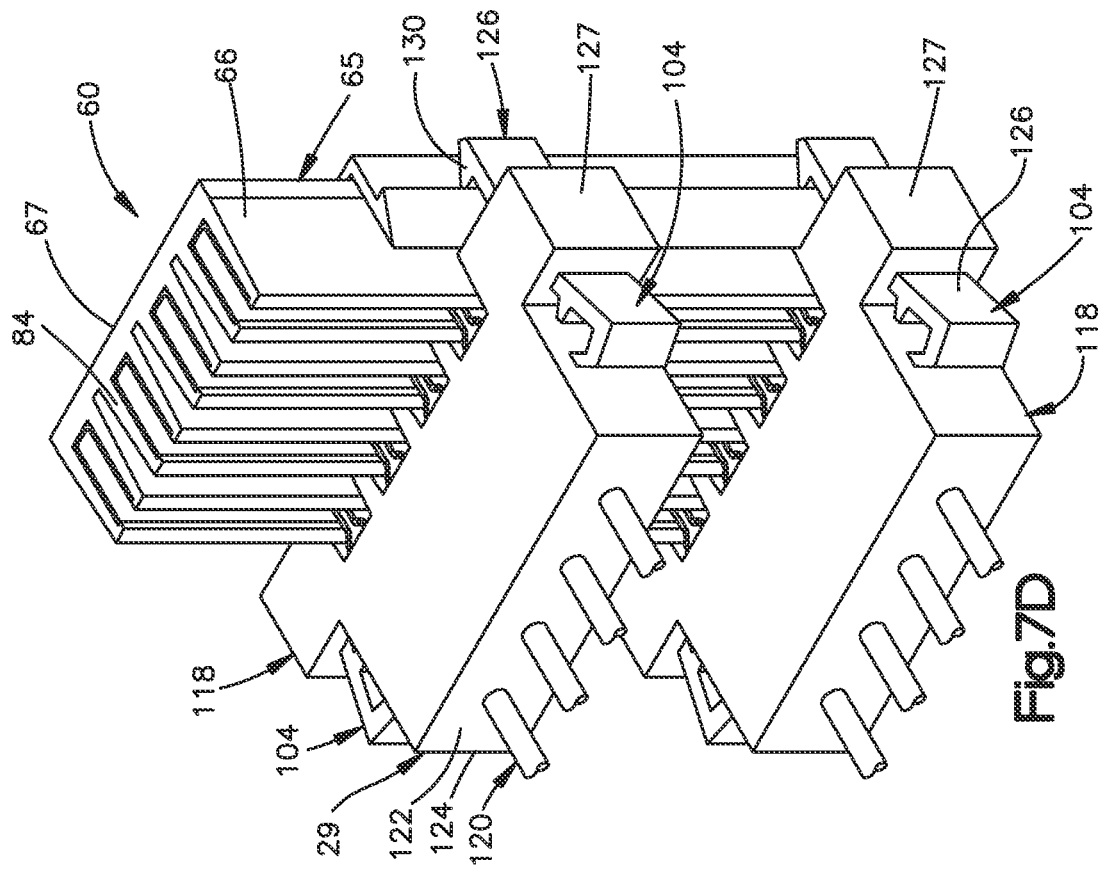
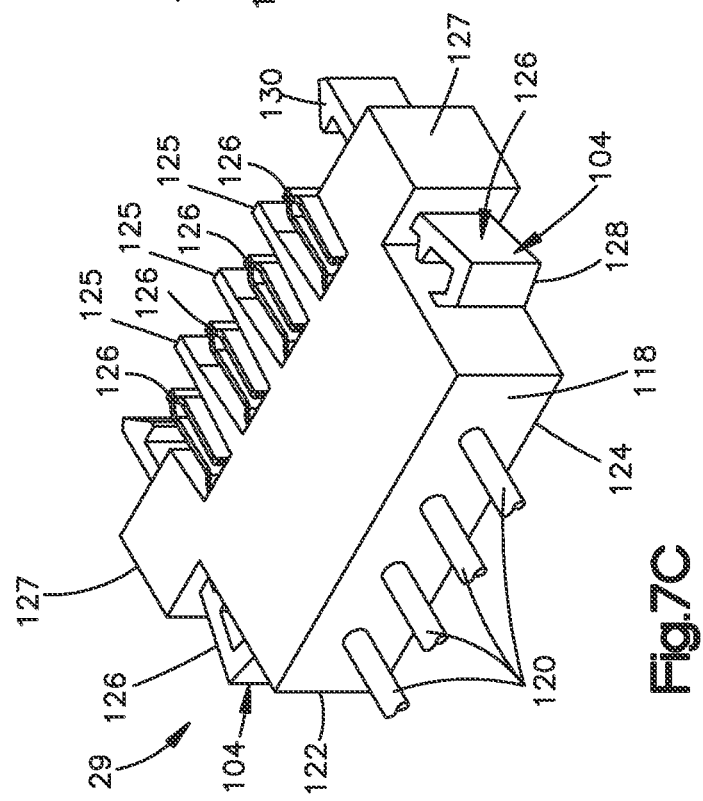

ELECTRICAL POWER CONNECTOR SYSTEM INCLUDING POWER RAIL

CROSS-REFERENCE TO RELATED APPLICATIONS

This claims the benefit of U.S. Patent Application Ser. No. 61/393,563 filed on Oct. 15, 2010, the disclosure of which is hereby incorporated by reference as if set forth in its entirety herein.

BACKGROUND

Electrical power connectors include a connector housing and a plurality of electrical conductors that are supported by the housing and are configured to receive electrical power from a first electrical component, and deliver the electrical power to a second electrical component. One example power connector is disclosed in U.S. Pat. No. 7,070,464, the disclosure of which is hereby incorporated by reference as if set forth in its entirety herein. Electrical power connectors are often disposed within an enclosed space of a chassis, and it is desirable to provide the power to the second electrical component at a desired position within the chassis.

SUMMARY

In accordance with one embodiment, an electrical connector system includes a plurality of electrical connectors and a rail assembly. Each electrical connector includes a connector housing and an electrical contact that is supported by the connector housing and configured to be mounted to a complementary electrical component. Each connector housing includes at least one forwardly projecting arm. The rail assembly includes a rail housing that retains a plurality of powered electrical conductors that are elongate along a column direction and spaced along a row direction. The rail housing further defines at least one alignment guide, such that the forwardly projecting arm is releasably inserted in the alignment guide when each of the plurality of electrical connectors is connected to the rail assembly along an insertion direction that is substantially perpendicular to both the column direction and the row direction, so as to electrically mate the electrical contacts to a complementary ones of the powered electrical conductors.

BRIEF DESCRIPTION OF THE DRAWINGS

The foregoing summary, as well as the following detailed description of an example embodiment of the application, will be better understood when read in conjunction with the appended drawings, in which there is shown in the drawings an example embodiment for the purposes of illustration. It should be understood, however, that the application is not limited to the precise arrangements and instrumentalities shown. In the drawings:

FIG. 1A is a perspective view of an electrical connector system including an electrical connector assembly and a rail assembly that are configured to deliver power to a substrate;

FIG. 2 is a perspective view of a plurality of electrical contacts of the electrical connectors arranged as illustrated in FIG. 1A;

FIG. 3 is a perspective view of an example electrical contact of the type illustrated in FIG. 2, and constructed in accordance with the prior art;

FIG. 4 is a perspective view of a connector housing of one of the electrical connectors illustrated in FIG. 1A; and FIG. 5 is a top plan view of the rail assembly illustrated in FIG. 1A.

FIG. 7A is a perspective view of the electrical connector system as illustrated in FIG. 1A, but showing a pair of electrical connector assemblies constructed in accordance with an alternative embodiment;

FIG. 7B is a perspective view of the electrical connector system as illustrated in FIG. 7A, but showing one of the electrical connector assemblies configured as a cable connector assembly in accordance with an alternative embodiment;

FIG. 7C is a perspective view of the cable connector assembly illustrated in FIG. 7B;

FIG. 7D is a perspective view of the electrical connector assembly as illustrated in FIG. 7B, but including a pair of cable connector assemblies each including a guide lock constructed in accordance with another embodiment.

DETAILED DESCRIPTION

Figure 1C:
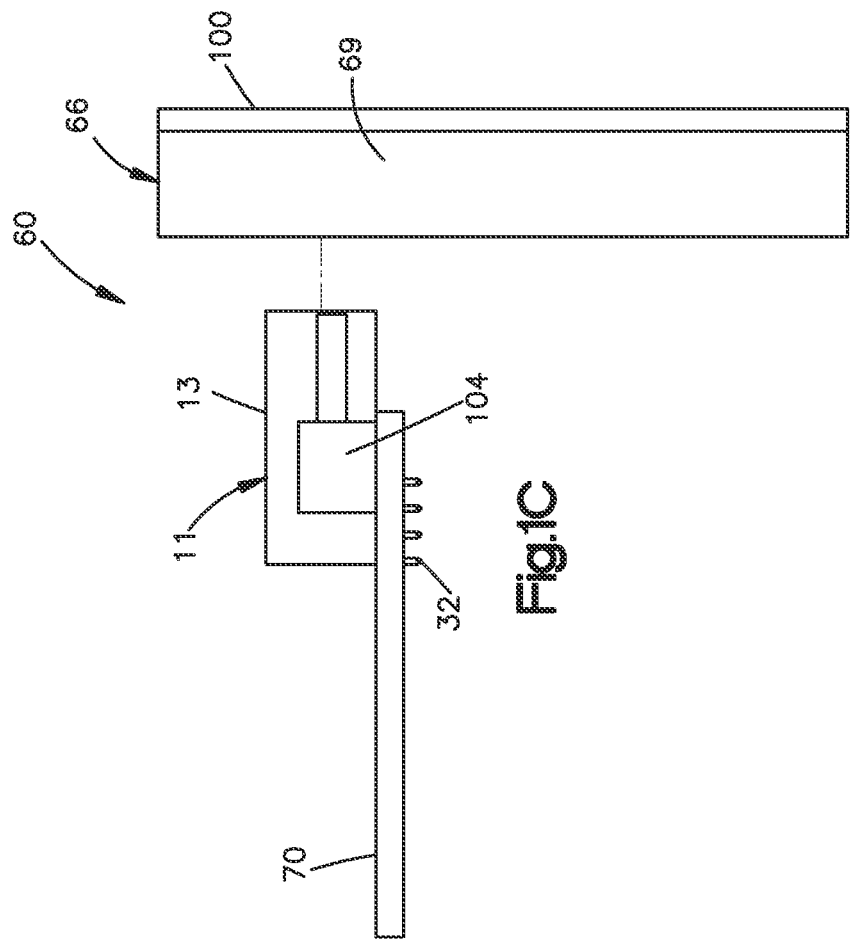
FIG. 1C is a side elevation view of the electrical connector system illustrated in FIG. 1A.
Figure 1B:
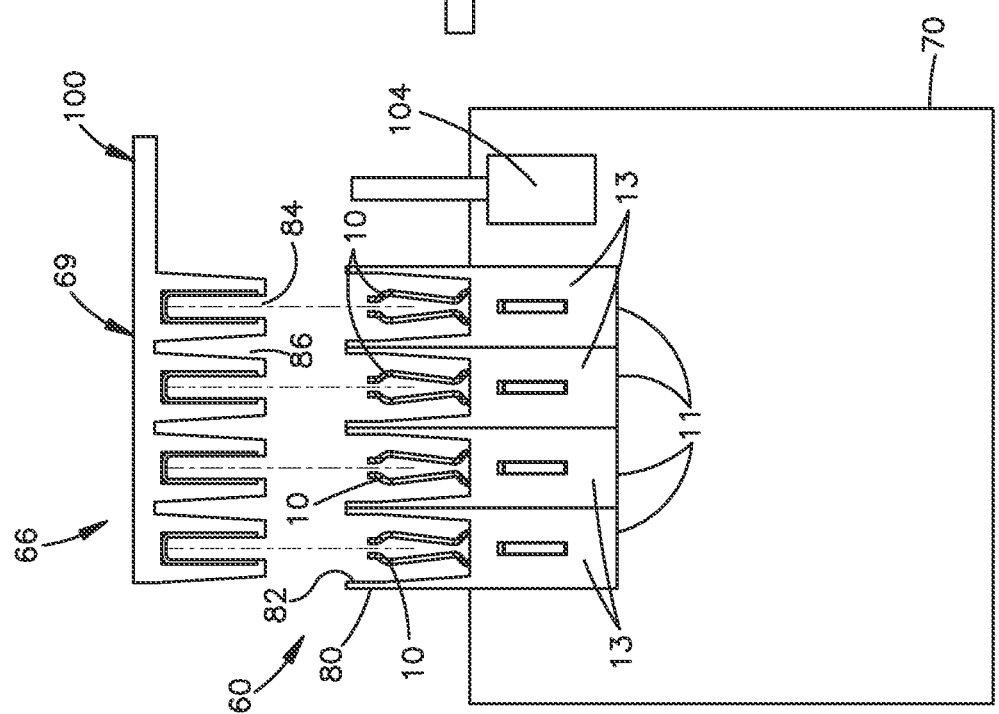
FIG. 1B is a top plan view of the electrical connector system illustrated in FIG. 1A.

Referring to FIGS. 1A-C, an electrical connector system 60 includes a first electrical component, a second electrical component 64, and an electrical connector assembly 29 that is configured to place the first electrical component 62 in electrical communication with the second electrical component 64. In accordance with the illustrated embodiment, the electrical connector assembly 29 includes at least one a first electrical connector 11, such as a first plurality of electrical connectors 11, which includes two or more electrical connectors 11, that are each configured to electrically connect the first complementary electrical component 62 to the second complementary electrical component 64.

In accordance with the illustrated embodiment, the first electrical component 62 is configured as an electrical connector 65, such as a rail assembly 66 that includes an array of conductive rails 67 and a rail housing 69 that supports the array of conductive rails 67. The rail housing 69 can be electrically insulative, and made from a dielectric material, such as plastic. In accordance with the illustrated embodiment, the second complementary electrical component 64 is configured as a substrate 68, such as a printed circuit board (PCB) 70. In accordance with the illustrated embodiment, the electrical connector system 60 can be an electrical power connector system, such that the electrical connectors 11 are electrical power connectors, and the rail assembly 66 is configured to deliver electrical power to the electrical connectors 11 which, in turn, delivers the electrical power to the substrate 68. The substrate 68, in turn, can deliver the electrical power to one or more other electrical components that are mounted the printed circuit board 70 and are in electrical communication with the electrical connectors 11 and at least one of the conductive rails 67. While the electrical connector system 60 includes four electrical connectors 11 arranged adjacent each other on the printed circuit board 70 in accordance with the illustrated embodiment, it should be appreciated that the electrical connector system 60 can include any number of electrical connectors 11 arranged as desired.

Each connector 11 includes an electrically insulative connector housing 13 that can be made from any suitable dielectric material, such as plastic. The connector housing 13 retains or supports a corresponding electrical contact 10. The electrical connector 11 defines a mating interface 15 that is configured to operatively engage the rail assembly 66, and a mounting interface 17 configured to operatively engage the printed circuit board 70. As illustrated in FIGS. 2-3, each of the electrical contacts 10 defines a mating portion 19 disposed proximate to the mating interface 15, and a mounting portion 21 disposed proximate to the mounting interface 17. The mating portion 19 is configured to electrically connect to a complementary one of the conductive rails 67, and the mounting portion 21 is configured to electrically connect to a complementary one of the electrical traces of printed circuit board 70.

In accordance with the illustrated embodiment, the mating interface 15 of the connector housing 13 is oriented substantially perpendicular with respect to the mounting interface 17, and the mating portions 19 of the electrical contacts 10 are oriented substantially perpendicular with respect to the mounting portions 21. Thus, each electrical connector 11 can be referred to as right-angle electrical connector. It should be appreciated, however, that the electrical connectors 11 can alternatively be configured as vertical electrical connectors, whereby the mating interface 15 is oriented substantially parallel with respect to the mounting interface 17, and the mating portions 19 of the electrical contacts 10 are oriented substantially parallel with respect to the mounting portions 21. In accordance with the illustrated embodiment, the electrical connector system can include a guide lock 104 that is releasably coupled between the printed circuit board 70 and the rail housing 69, and thus is also releasably coupled between the electrical connectors 11 and the rail housing 69. For instance, the rail housing 69 can include a side extension 100 that extends out along the row direction with respect to an outermost one of the conductive rails 67. The guide lock 104 can be attached to both the printed circuit board 70 and to the side extension 100. In accordance with one embodiment, the rail housing 69 defines an engagement member such as a slot 102 that extends through the side extension 100 and is elongate along a direction substantially parallel to the conductive rails 67. The guide lock 104 can define a reversible interference fit with the side extension 100 inside the slot 102 such that the printed circuit board 70 can be adjustable positioned along the conductive rails 67. The guide lock 104, and thus the printed circuit board 70, can thus be reversibly locked in a first position in the slot 102, unlocked and translated along the slot 102, and subsequently locked in a second position in the slot 102 that is different than the first position. Alternatively or additionally, the printed circuit board 70 can be supported by an external rack in one of a plurality of positions along the conductive rails 67. One example of a guidance/retention member is described in U.S. Pat. No. 2,353,248, the contents of which are hereby incorporated by reference in its entirety.

Referring to FIGS. 2 and 3, each electrical contact 10 is illustrated as an electrical power contact, and can be configured as described in U.S. Pat. No. 7,070,464, the disclosure of which is hereby incorporated by reference as if set forth in its entirety herein. The electrical contact 10 defines a front end 25a an opposed rear end 25b, a top end 25c and an opposed bottom end 25d, and opposed sides 25e. The electrical contact 10 has two opposed major side walls 12 and 14 that include respective side panels 28 and 30. The side panels 28 and 30 are substantially planar in accordance with the illustrated embodiment, and extend substantially parallel to each other. The electrical contact 10 includes a front projection 16 extending forward from the side panels 28 and 30.

The opposed sides 25e are spaced apart along a lateral direction A, the front end rear ends 25a and 25b are spaced apart along a longitudinal direction L that is substantially perpendicular with respect to the lateral direction A, and the top and bottom ends 25c and 25d are spaced apart along a transverse direction T that is substantially perpendicular with respect to the lateral direction A and the longitudinal direction L. In accordance with the illustrated embodiment, the transverse direction T is oriented vertically, and the longitudinal and lateral directions L and A are oriented horizontally, though it should be appreciated that the orientation of the electrical connector 11 and associated connector housing 13 and retained electrical contact 10 may vary during use.

The front projection 16 includes a pair of opposed cantilever contact beams 27 that extend forward from the side panels 28 and 30. The cantilever contact beams 27 each defines an inwardly converging proximal section 22 that converges toward the other contact beam along a forward direction. Each cantilever contact beam 27 includes a diverging middle section 23 that extends forward from the proximal section and diverges away from the other contact beam 27. Each cantilever contact beam 27 further includes an arcuate contact section 24 disposed forward of the middle section that tapers inwardly toward the other contact beam to a distal section 26. The opposed distal sections 26 can extend substantially parallel to each other. The distal sections 26 can be positioned slightly apart when the beams 27 are in relaxed condition, but come together when the beams are deflected as the front projection is inserted into the conductive rail 67 at any location along the length of the conductive rail 67. This provides over-stress protection for the beams during mating. Each electrical contact 10 includes a plurality of terminals 32, such as through-hole pins 34 that extend from the bottom end 25d of each side panel 28 and 30. The terminals 32 can be configured as solder-to-board pins (as shown) or can comprise press fit pins, surface mount tails, or other types of terminals.

The electrical contact 10 can further include a front bridging element 42 and a rear bridging 44 element that is spaced from the front bridging element 42. The bridging elements 42 and 44 can be arcuate in shape, and join the upper ends 25c of the side panels 28 and 30. A medial space 46, adapted for airflow, is disposed and defined between the panels 28 and 30. The electrical contact 10 can further include a plurality of positioning elements. For instance, the electrical contact includes lateral positioning elements, such as bent tangs 50 that project laterally out from the rear ends 25b of the side panels 28 and 30. The bent tangs 50 are configured to accurately center the electrical contacts 10 within respective cavities in the connector housing 13. The electrical contact 10 can further include a positioning feature, such as raised lug 52 that extends up from the upper end 25c of the side panels 28 and 30. The raised lugs 52 are configured to accurately position the electrical contacts 10 within respective cavities in the connector housing 13. The electrical contact 10 can further include a flexible retention arm 54 that extends rearward and upward from the front bridging element 42. The retention arm 54 defines a locating surface 56 at its rear or distal end. The contact 10 can be stamped or otherwise formed as a single piece from a strip of a suitable contact material such as phosphor bronze alloys or beryllium copper alloys.

Referring now to Figs 1A-B and FIG. 4, the electrical connector housing 13 defines a front end 70a, a longitudinally opposed rear end 70b, a top end 70c and a transversely opposed bottom end 70d, and laterally opposed sides 70e. At least one up to all of the connector housings 13 includes a substantially rectangular housing body 72 and at least one arm 74, such as a pair of laterally opposed arms 74, that project forward from the housing body 72. Each arm 74 defines a proximal end 74a that is integrally connected to the housing body 72 and an opposed distal end 74b. The sides 70e of adjacent connector housings 13 can abut each other, or can be disposed in close proximity to each other, when mounted onto the printed circuit board 70. Alternatively, it should be appreciated that the connector housings 13 can be integrally or discretely connected to each other.

The connector housing 13 defines a substantially rectangular pocket 76 that extends from the rear end of the housing body 72 to the front end of the housing body 72. The rectangular pocket 76 is sized to receive the side walls 12 and 14 of the electrical contact 10, such that the contact beams 27 project forward to a void 73 that is disposed between the arms 74, and terminate longitudinally inward with respect to the distal ends 74b of the arms 74. The connector housing 13 further includes a plurality of positioning elements configured to engage the positioning elements of the electrical contact 10. For instance, the connector housing 13 includes a retention aperture 78 that extends transversely through the top end 70c of the housing body 72 and is configured to receive the flexible retention arm 54 of the electrical contact 10.

Each arm 74 defines a laterally outer surface 80 and an opposed laterally inner surface 82. The outer surface 80 can extend substantially longitudinally, such that the outer surfaces 80 of adjacent connector housings 13 can be substantially parallel and flush with each other. Alternatively, the outer surfaces 80 of adjacent connector housings 13 can be spaced from each other as desired. The inner surface 82 of each arm 74 is tapered laterally outward toward the opposed outer surface 80 along a longitudinally forward direction. As will now be described, the inner surfaces 82 of a pair of arms 74 of adjacent electrical connector housings 13 provide tapered engagement surfaces that are configured to engage complementary alignment guides 84 of the rail assembly 66. Thus, it can be said that the connector housings 13 define at least one tapered surface configured to engage a complementary tapered surface of the rail assembly 66.

In particular, referring to FIGS. 1A-B and FIG. 5, the rail assembly 66 includes an insulative rail housing 69 that defines a front end 69a and an opposed rear end 69b that is spaced from the front end 69a along the longitudinal direction L, a top end 69c and an opposed bottom end 69d spaced from the top end 69c along the transverse direction T, and opposed sides 69e spaced from each other along the lateral direction A. The rail housing 69 can be made of any suitable dielectric material, such as plastic. The rail assembly 66 defines a plurality of vertically elongate receptacles 84 that extend into the rail housing 69, such as the front end 69a of the rail housing 69, and a plurality of vertically elongate alignment guides 86 that extend into the rail housing 69 at locations between adjacent receptacles 84. Otherwise stated, the receptacles 84 and the alignment guides 86 are alternatingly arranged in the rail housing 69 along the lateral direction A.

The receptacles 84 are illustrated as pockets that extend into the front end 69a of the rail housing 69. The receptacles 84 can be substantially rectangular shaped as illustrated, or alternatively shaped as desired. The rail assembly 66 further includes a powered electrical conductor in the form of a conductive rail 67 disposed in each receptacle 84. Each rail 67 includes a pair of side arms 89 spaced along the lateral direction A, and a rear cross-bar 90 connected between the rear ends of the arms 89. The rails 67 are vertically elongate along their length of elongation, which can define a column direction in the transverse direction T, and are spaced from each other along the lateral direction A, which can define a row direction that is substantially perpendicular with respect to the transverse direction T. The rails 67 each define a contact-receiving space 92 between the arms 89, the contact-receiving space 92 configured to receive the contact beams 27. The contact-receiving space 92 defines a lateral distance or width between the opposed arms 89 that is less than the lateral distance between the opposed contact sections 24 of the complementary electrical contact 10, such that the contact beams 27 are compressed together as they are inserted into the contact-receiving space 92 of the receptacle 84 along a longitudinally forward insertion direction that is substantially perpendicular to both the column direction and the row direction, so as to electrically mate the electrical contacts 10 to a complementary one of the electrically conductive rail 67.

The alignment guides 86 are illustrated as tapered pockets 94 that extend into the front end 69a of the rail housing 69. The pockets 94 are defined by opposed interior walls 96 of the connector rail housing 69. At least one or both of the opposed interior walls 96 of at least one up to all of the pockets 94 extend inwardly toward the other interior wall along a rearward direction from the front end 69a of the rail housing 69 toward the rear end 69b of the rail housing 69. Thus, at least one or both of the opposed interior walls 96 of at least one up to all of the pockets 94 extend inwardly toward the other interior wall along a rearward insertion direction from the front end 69a of the rail housing 69. The walls 96 can be tapered so as to define a slope that is substantially equal to the slope of the tapered inner surfaces 82 of the connector housing 13. The walls 96 and/or the inner surfaces can be spaced apart a distance that causes the arms 74 of adjacent connector housings 13 to be releasably inserted, for instance press-fit or otherwise inserted, in the alignment guides 86 at any location along the length of the alignment guides 86 when the electrical connectors 11 mate with the rail assembly 66, such that the electrical contacts 10 are electrically connected to the receptacle conductors 88, thereby releasably fixing the electrical connectors 11 to the rail assembly 66. Thus, it can be said that the rail housing 69 defines at least one tapered surface that is configured to receive the at least one tapered surface of the connector housings 13 that is inserted into the at least one tapered surface of the rail housing 69 so as to releasably lock the electrical connectors 11 to the rail assembly 66 with respect to inadvertent relative movement. It should be appreciated that both the walls 96 and the inner surfaces 82 can extend substantially straight as they extend in the longitudinal direction L, or can be curved as desired.

Thus, during operation, the electrical connectors 11 are brought to a desired height along the rail assembly 66, at which point the electrical connectors 11 are mated with the rail assembly 66 by inserting the electrical connectors 11 along the insertion direction such that the contact beams 27 are received by a complementary contact-receiving space 92 of the receptacle 84, thereby placing the contact beams 27 in electrical contact with the corresponding electrically conductive rail 67. Furthermore, the adjacent arms 74 of adjacent connector housings 13 can be inserted into the alignment guides 86 so as to position connector housings 13 in the rail housing 69. In accordance with one embodiment, the adjacent arms 74 of adjacent connector housings 13 can be press-fit into the alignment guides 86 so as to lock the connector housings 13 in the rail housing 69 with respect to inadvertent relative movement. The adjacent arms 74 can define guide members that cooperate with the alignment guide 86 so as to guide movement of the electrical connectors 11 relative to the rail assembly along the column direction. The guide lock 104 can be engaged so as to lock the electrical connectors 11 with respect to inadvertent movement of the electrical connectors 11 relative to the rail assembly 66. Alternatively, the arms 74 can be received in the alignment guides 86 so as to allow translation of the electrical connector assembly 29 relative to the rail assembly 66.

The rails 67 receive electrical power from a power supply that is delivered from the rails to the electrical contacts 10, which in turn deliver the power to the printed circuit board 70 which delivers the power to another electrical component. It should be appreciated that one or more, up to all of, the rails 67 can receive power from a common power source, or can independently receive power from different power sources, and can thus carry different levels of power.

Figure 6A:
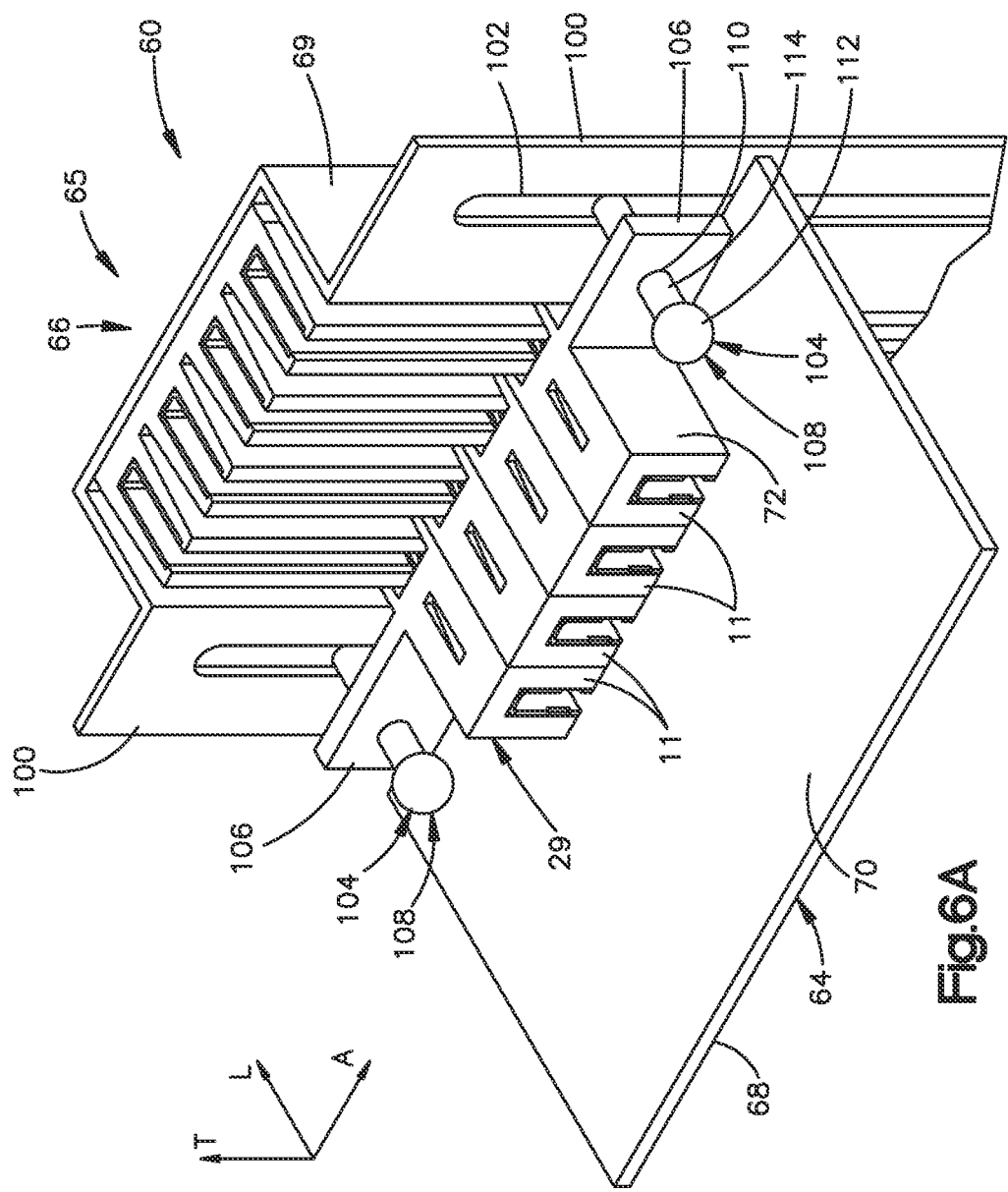
FIG. 6A is a perspective view of the electrical connector system illustrated in FIG. 1A including a guide lock constructed in accordance with an alternative embodiment.
Figure 6B:
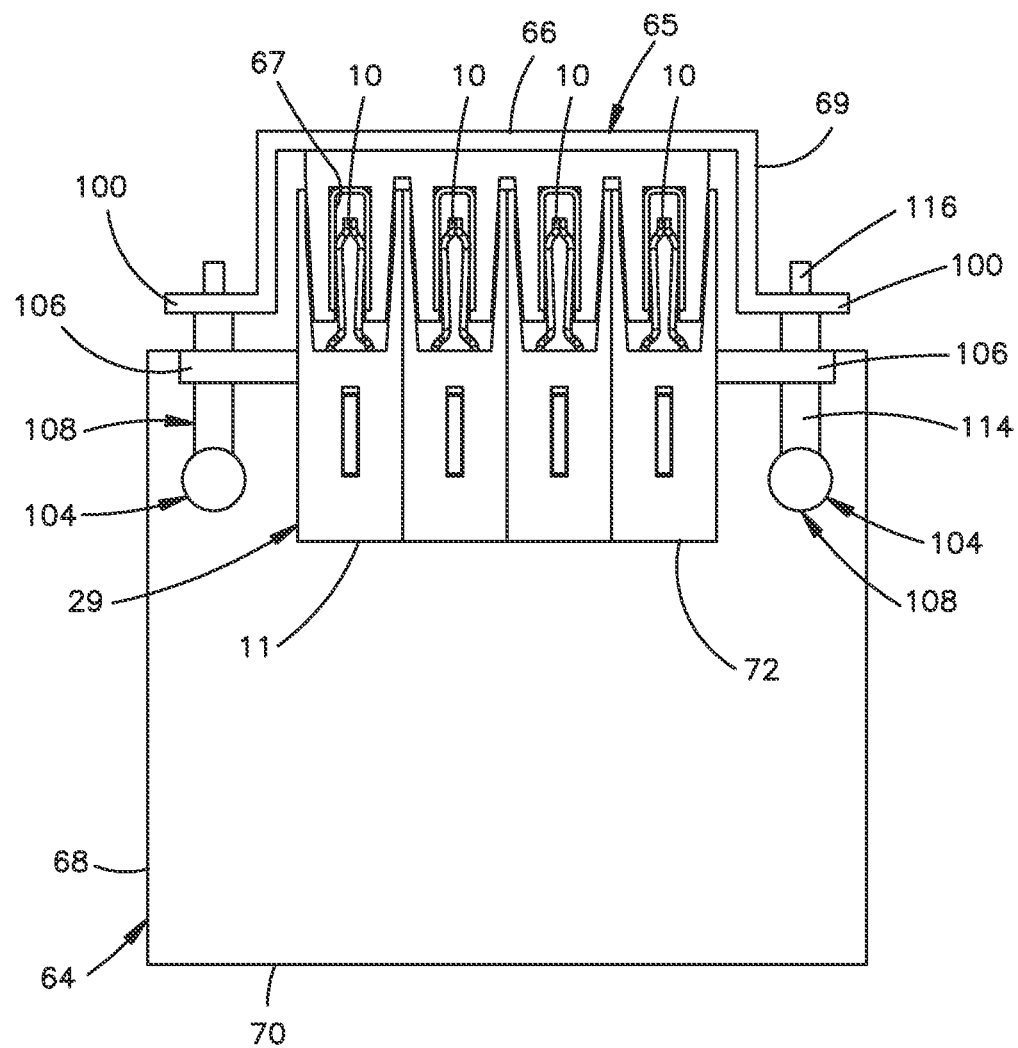
FIG. 6B is a top plan view of the electrical connector system illustrated in FIG. 6A.

As described above with respect to FIG. 1A, the electrical connector system 60 can include at least one guide lock 104 that is coupled between the rail housing 69 and the printed circuit board 70. In accordance with one embodiment illustrated in FIGS. 6A-B, the connector housing body 72 of at least a select one of the electrical connectors 11, such as one or both of the outer electrical connectors 11 along the row direction, can include at least one outwardly extending mounting plate 106. The guide lock 104 can include a locking member such as a locking pin 108 that extends longitudinally through an aperture 110 of the mounting plate 106. The locking pin 108 includes a knob 112 at its proximal end, and a shaft 114 that extends longitudinally forward from the knob 112 and has a narrowed tip 116 at its distal end. The tip 116 is sized to be received in the slot 102 in an engaged position so as to lock the connector assembly 29 to the side extension 100 of the rail housing 69. The locking pin 108 can be removed from the slot 102 so as to facilitate vertical translation of the connector assembly 29 relative to the rail assembly 66. The locking pin 108 can be spring loaded toward the engaged position as desired. Thus, the guide lock 104 can be attached to a select one of the electrical connectors 11, which in turn is attached to the underlying printed circuit board 70, and the rail housing 69.

Figure 7E:
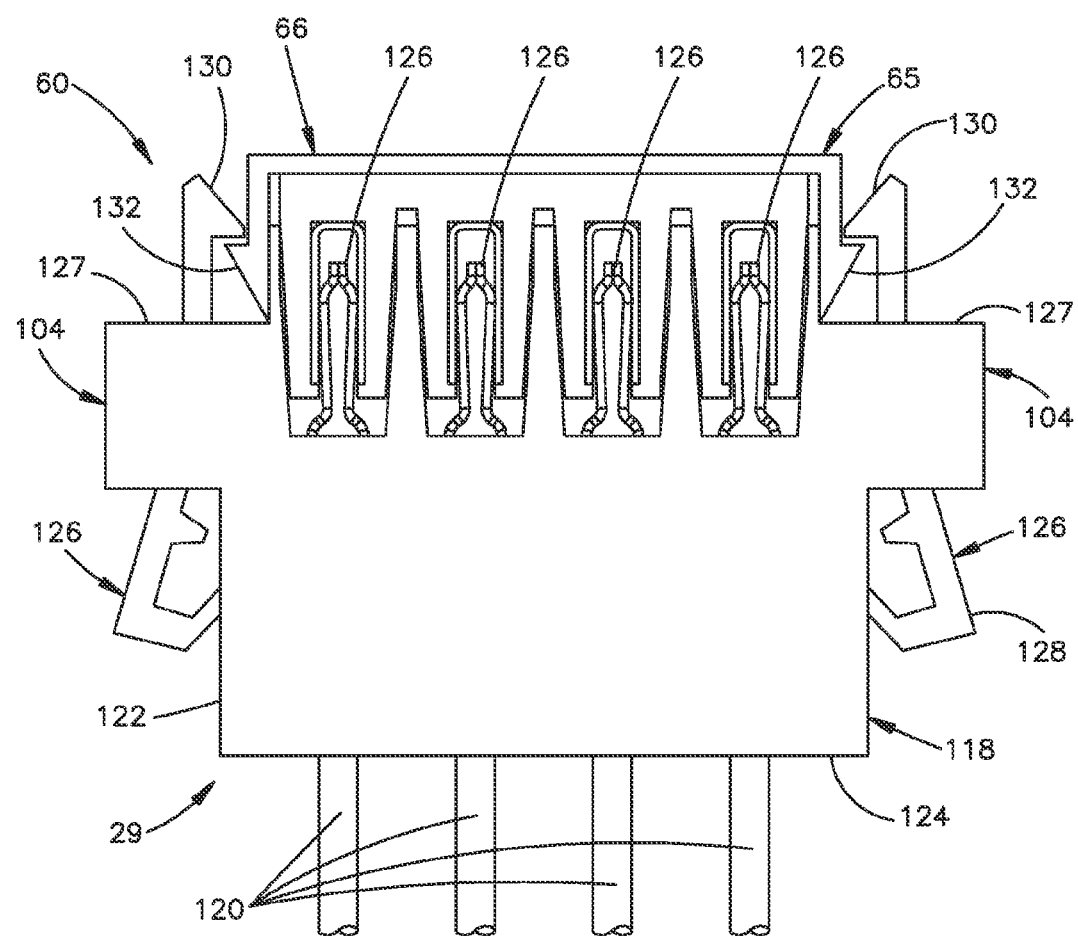
FIG. 7E is a top plan view of the electrical connector assembly illustrated in FIG. 7D.

Referring now to FIG. 7A, the rail assembly 66 can be mounted to a printed circuit board 70 at its base so as to facilitate electrical current flow through the conductive rails 67. It should be appreciated that the electrical connector system 60 can include a plurality of electrical connector assemblies 29 of the type described above. For instance, a pair of electrical connector assemblies 29 are shown inserted into the rail assembly 66 in the manner described above. Accordingly, the electrical connector assemblies 29, and thus the electrical connectors 11, can be inserted into the rail assembly 66 anywhere along the length of the rail assembly 66 (e.g., in the column direction). One of the electrical connector assemblies 29 includes four electrical connectors 11, while the other electrical connector assembly includes two electrical connectors 11. It should be appreciated that the electrical connector system 60 can include any number of electrical connector assemblies 29 slidably connected to the rail assembly 66 in the manner described above, and configured to be releasably locked in the complementary rails 67 via any suitable guide lock 104 as desired. Furthermore, it should be appreciated that the electrical connector assemblies 29 can include any number of electrical connectors 11, such as at least one, and any type of electrical connector as desired.

For instance, referring now to FIG. 7B, it should be appreciated that the electrical connector assembly 29 can be configured to be electrically coupled to the rail assembly 66 at one end, and electrically coupled to any electrical component 64 as desired. For instance, a first electrical connector assembly 29 is shown electrically connected to a printed circuit board 70 in the manner described above. The electrical connector system 60 can include a second electrical connector assembly 29, which can include at least one such as a plurality of cable connectors 118 constructed substantially as described above with respect to the first electrical connectors 11, however the cable connector 118 is configured to be electrically connected, or mounted, to a complementary electrical component such as one or more cables 120 so as to place the cables 120 in electrical communication with the power rails 67. The electrical connector system 60 can further include a pair of cable connectors 118 as illustrated in FIG. 7D.

Referring to FIG. 7C, the cable connector 118 includes a substantially rectangular insulative cable connector housing 122 having a substantially rectangular housing body 124 and a plurality of arms 125 extending out from the housing body 124 and configured to engage the alignment guides 86 of the rail assembly 66 in the manner described above with respect to the arms 74 of the electrical connectors 11. The cable connector 118 further includes a plurality of electrical contacts 126 that are retained by the cable connector housing 122 and are configured to mate with the conductive rails 67 in the manner described above with respect to the electrical connector 11. Each of the electrical contacts 126 can be further configured to be electrically connected to a cable 120 that extends out from the cable connector housing 122. The electrical connector 118 can further include a guide lock 104 that cooperates with the rail housing 69 so as to releasably retain the lock the position of the electrical connector 118 on the rail assembly 66. In accordance with the illustrated embodiment, the guide lock 104 includes a latch 126 that extends through a mounting plate 127 that extends laterally out from the connector housing body 124. The latch 126 includes an actuator 128 at its proximal end, and an engagement member in the form of a barb 130 at its distal end. The rail housing 69 includes a complementary engagement member in the form of a barb 132 that cooperates with the barb 130 of the latch 126 so as to lock the cable connector 118 to the rail assembly 66. The actuator 128 can be depressed to remove the barb 130 from interference with the barb 132 when it is desired to move or remove the cable connector 118 relative to the rail assembly 66. It should be appreciated that any of the electrical connectors described above can include a guide lock 104 constructed as described herein, or alternatively constructed as desired so as to releasably fix the position of the electrical connector on the rail assembly 66.

It should be appreciated that a method can be provided for connecting a plurality of electrical connectors to a rail assembly. The electrical connectors can each include a connector housing and at least one electrical contact that is supported by the connector housing and configured to be mounted to an underlying substrate. Each connector housing can include at least one forwardly projecting arm that defines at least one tapered surface. The rail assembly can include a rail housing that retains a plurality of powered electrical conductors that are elongate along a column direction and spaced along a row direction. The rail housing can further define a plurality of alignment guides that each defines at least one tapered surface. The method can include the steps of placing the electrical contacts of the electrical connectors in electrical communication with respective ones of the powered electrical conductors along a direction that is substantially perpendicular to the row direction and the column direction, and inserting the arm of each of the connector housings into respective ones of the alignment guides so as to releasably fix the electrical connectors to the rail assembly. The method can further include the step of releasably coupling a guide lock between the electrical connectors and the rail housing. The method can further include the step of releasably coupling the electrical connectors to the rail assembly in a first position, moving the electrical connectors along the column direction, for instance translating the electrical connectors along the powered electrical conductors, to a second position, and releasably locking the electrical connectors to the rail assembly in the second position. The electrical connectors can be locked to the rail assembly in the first position, such that the method can further include the step of unlocking the electrical connectors from the rail assembly when in the first position prior to moving the electrical connectors along the column direction. The electrical connectors can be relesably locked in the first and second positions via a press-fit engagement between the projecting arms and the alignment guide, or via the guide lock 104.

Thus, in accordance with one embodiment, a method can be provided for positioning a plurality of electrical connectors along respective powered electrical conductors of a rail assembly. The method can include the step of providing or teaching the use of a plurality of electrical connectors, such as the electrical connectors 11 having a connector housing, such as the connector housing 13, and an electrical contact, such as the electrical contact 10, supported by the connector housing 13. The method can further include teaching the step of electrically connecting the electrical contacts 10 to the powered electrical conductors when the electrical connectors are disposed at a first position relative to the powered electrical conductors. The method can further include teaching the step of inserting at least one forward projecting arm, such as at least one of the arms 74, into a complementary alignment guide, such as the alignment guide 86, of the rail assembly 66, so as to relesably lock the electrical connectors to the rail assembly in the first position. The method can further include teaching the steps of 1) removing the arm 74 from the complementary alignment guide 86, for instance by pulling the arm 74 out from the alignment guide 86, 2) moving the electrical connectors to a second position with respect to the powered electrical conductors that is different than the first position, and 3) electrically connecting the electrical contacts to the powered electrical conductors when the electrical connectors are in the second position. The method can further include teaching the step of inserting the arm 74 in the alignment guide 86 when the electrical connectors are in the second position so as to relesably lock the electrical connectors to the rail assembly in the second position.

The embodiments described in connection with the illustrated embodiments have been presented by way of illustration, and the present invention is therefore not intended to be limited to the disclosed embodiments. For instance should be appreciated that the electrical connector 11 is illustrated herein as a plug or header connector, and the electrical contacts 10 can be referred to as plug or header contacts. The rail assembly 66 can be referred to as a receptacle connector having electrical power conductors in the form of rails 67 that receive the electrical contacts 10. It should be appreciated, however, that the electrical connector 11 could be configured as a receptacle connector, and the rails 67 can be constructed as plug or header conductors that are received by the electrical contacts 10. Furthermore, the structure and features of each the embodiments described above can be applied to the other embodiments described herein, unless otherwise indicated. Accordingly, those skilled in the art will realize that the invention is intended to encompass all modifications and alternative arrangements included within the spirit and scope of the invention, for instance as set forth by the appended claims.

What is claimed:

1. An electrical connector system comprising:
a plurality of electrical connectors, each including a connector housing and an electrical contact that is supported by the connector housing and configured to be mounted to a complementary electrical component, each connector housing including first and second forwardly projecting arms, the electrical contact disposed between the first and second forwardly projecting arms;
a rail assembly including a rail housing that retains a plurality of powered electrical conductors that are elongate along a column direction and spaced along a row direction, the rail housing further defining first and second alignment guides, such that the first and second forwardly projecting arms is releasably inserted in respective ones of the first and second alignment guides when each of the plurality of electrical connectors is connected to the rail assembly along an insertion direction that is substantially perpendicular to both the column direction and the row direction, so as to electrically mate the electrical contacts to a complementary ones of the powered electrical conductors.

2. The electrical connector system as recited in claim 1, wherein the rail housing defines a front surface and an opposed rear surface, the alignment guides extend into the front surface, and each of the alignment guides defines a pair of opposed surfaces that are tapered toward each other along a direction from the front surface toward the opposed rear surface.

3. The electrical connector system as recited in claim 1, wherein the complementary electrical component is a cable, and the electrical connectors comprise at least one cable connector including a cable connector housing and an electrical contact supported by the connector housing, each of the first and second forwardly projecting arms defines at least one tapered surface configured to be received in the respective one of the first and second alignment guides.

4. The electrical connector system as recited in claim 1, wherein the powered electrical conductors define a pair of side arms that are spaced a distance so as to cause a respective mating end of the electrical contact to compress as it is inserted between the side arms so as to mate the electrical contact to a select one of the powered electrical conductors.

5. The electrical connector system as recited in claim 1, wherein the electrical contact and no other electrical contacts of the electrical connector is disposed between the first and second forwardly projecting arms.

6. The electrical connector system as recited in claim 1, wherein the complementary electrical component is a printed circuit board.

7. The electrical connector system as recited in claim 1, further comprising a guide lock configured to be coupled between the complementary electrical component and the rail housing so as to releasably lock the electrical connectors to complementary ones of the powered electrical conductors.

8. The electrical connector system as recited in claim 7, wherein the guide lock is configured to be attached to the complementary electrical component.

9. The electrical connector system as recited in claim 7, wherein the guide lock is configured to be attached to a select one of the electrical connectors.

10. The electrical connector system as recited in claim 7, wherein the guide lock is configured to be attached to an outermost one of the electrical connectors along the row direction.

11. The electrical connector system as recited in claim 7, wherein the rail housing defines an outwardly extending side extension that extends out along the row direction with respect to one of the conductive rails, and the rail housing defines a slot that extends through the side extension, the slot being elongate in the column direction, and the guide lock extends through the slot.

12. The electrical connector system as recited in claim 7, wherein the guide lock is configured to be releasably coupled to the rail housing, such that guide lock is movable from a first position in the slot to a second position in the slot that is different than the first position.

13. The electrical connector system as recited in claim 12, wherein the guide lock is configured to be releasably locked to the rail housing in the first and second positions.

14. A method of connecting a plurality of electrical connectors to a rail assembly, the electrical connectors each including a connector housing and an electrical contact that is supported by the connector housing and configured to be mounted to an underlying substrate, each connector housing including a pair of forwardly projecting arms, wherein the electrical contact is disposed between the pair of forwardly projecting arms, and the rail assembly including a rail housing that retains a plurality of powered electrical conductors that are elongate along a column direction and spaced along a row direction, the rail housing further defining a plurality of alignment guides, the method comprising the steps of:
placing the electrical contact of the electrical connectors in electrical communication with respective ones of the powered electrical conductors along a direction that is substantially perpendicular to the row direction and the column direction;
inserting each of the pair of arms of each of the connector housings into respective ones of the alignment guides so as to releasably fix the electrical connectors to the rail assembly.

15. The method as recited in claim 14, further comprising the step of releasably coupling a guide lock between the electrical connectors and the rail housing.

16. The method as recited in claim 14, further comprising the step of releasably coupling the electrical connectors to the rail assembly in a first position, translating the electrical connectors along the powered electrical conductors to a second position, and releasably locking the electrical connectors to the rail assembly in the second position.

17. The method as recited in claim 14, wherein the powered electrical conductors define a pair of side arms, and the method further comprises the step of compressing a mating end of the electrical contact against the side arms during the inserting step.

18. A method of positioning a plurality of electrical connectors along respective powered electrical conductors of a rail assembly, the method comprising the steps of:
providing or teaching the use of a plurality of electrical connectors each having a connector housing and an electrical contact supported by the connector housing;
teaching the step of electrically connecting the electrical contacts to the powered electrical conductors when the electrical connectors are disposed at a first position relative to the powered electrical conductors;
teaching the step of inserting a pair of forward projecting arms of the connector housing into respective complementary alignment guides of the rail assembly so as to releasably lock the electrical connectors to the rail assembly in the first position;
teaching the steps of removing the arms from the complementary alignment guide, moving the electrical connectors to a second position with respect to the powered electrical conductors that is different than the first position, and electrically connecting the electrical contacts to the powered electrical conductors when the electrical connectors are in the second position; and
teaching the step of inserting the arms in the alignment guides when the electrical connectors are in the second position so as to releasably lock the electrical connectors to the powered electrical conductors in the second position.

19. The electrical connector system as recited in claim 17, further comprising the step of teaching compressing a mating end of the electrical contact against the side arms during the inserting step.

20. An electrical connector system comprising:
a plurality of electrical connectors, each including a connector housing and an electrical contact that is supported by the connector housing and configured to be mounted to a complementary electrical component, each connector housing including at least one forwardly projecting arm;
a rail assembly including a rail housing that retains a plurality of powered electrical conductors that are elongate along a column direction and spaced along a row direction, the rail housing further defining at least one alignment guide, such that the forwardly projecting arm is releasably inserted in the alignment guide when each of the plurality of electrical connectors is connected to the rail assembly along an insertion direction that is substantially perpendicular to both the column direction and the row direction, so as to electrically mate the electrical contacts to a complementary ones of the powered electrical conductors,
wherein the powered electrical conductors define a pair of side arms that are spaced a distance so as to cause a respective mating end of the electrical contact to compress as it is inserted between the side arms so as to mate the electrical contact to a select one of the powered electrical conductors.

21. The electrical connector system as recited in claim 20, wherein the rail housing defines a front surface and an opposed rear surface, the alignment guide extends into the front surface, and the alignment guide defines a pair of opposed surfaces that are tapered toward each other along a direction from the front surface toward the opposed rear surface.

22. The electrical connector system as recited in claim 20, wherein the complementary electrical component is a cable, and the electrical connectors comprise at least one cable connector including a cable connector housing and an electrical contact supported by the connector housing, each cable connector housing including at least one forwardly projecting arm that defines at least one tapered surface configured to be received in the at least one alignment guide.

23. The electrical connector system as recited in claim 20, wherein the connector housing includes a pair of forwardly projecting arms that are configured to be inserted in complementary alignment guides.

24. The electrical connector system as recited in claim 20, wherein the complementary electrical component is a printed circuit board.

25. An electrical connector system comprising:
a plurality of electrical connectors, each including a connector housing and an electrical contact that is supported by the connector housing and configured to be mounted to a substrate, each connector housing including at least one forwardly projecting arm;
a rail assembly including a rail housing that retains a plurality of powered electrical conductors that are elongate along a column direction and spaced along a row direction, the rail housing further defining at least one alignment guide, such that the forwardly projecting arm is releasably inserted in the alignment guide when each of the plurality of electrical connectors is connected to the rail assembly along an insertion direction that is substantially perpendicular to both the column direction and the row direction, so as to electrically mate the electrical contacts to a complementary ones of the powered electrical conductors; and a guide lock configured to be coupled between the substrate and the rail housing so as to releasably lock the electrical connectors to complementary ones of the powered electrical conductors.

26. The electrical connector system as recited in claim 25, wherein the rail housing defines a front surface and an opposed rear surface, the alignment guide extends into the front surface, and the alignment guide defines a pair of opposed surfaces that are tapered toward each other along a direction from the front surface toward the opposed rear surface.

27. The electrical connector system as recited in claim 25, wherein the complementary electrical component is a cable, and the electrical connectors comprise at least one cable connector including a cable connector housing and an electrical contact supported by the connector housing, each cable connector housing including at least one forwardly projecting arm that defines at least one tapered surface configured to be received in the at least one alignment guide.

28. The electrical connector system as recited in claim 25, wherein the guide lock is configured to be attached to the substrate.

29. The electrical connector system as recited in claim 25, wherein the guide lock is configured to be attached to a select one of the electrical connectors.

30. The electrical connector system as recited in claim 25, wherein the guide lock is configured to be attached to an outermost one of the electrical connectors along the row direction.

31. The electrical connector system as recited in claim 25, wherein the rail housing defines an outwardly extending side extension that extends out along the row direction with respect to one of the conductive rails, and the rail housing defines a slot that extends through the side extension, the slot being elongate in the column direction, and the guide lock extends through the slot.

32. The electrical connector system as recited in claim 25, wherein the guide lock is configured to be releasably coupled to the rail housing, such that guide lock is movable from a first position in the slot to a second position in the slot that is different than the first position.

33. The electrical connector system as recited in claim 32, wherein the guide lock is configured to be releasably locked to the rail housing in the first and second positions.

* * * * *